United States Patent

Gear

[15] 3,696,386
[45] Oct. 3, 1972

[54] THERMOMETER-TYPE INDICATOR
[72] Inventor: John Gear, Huntington, N.Y.
[73] Assignee: Atlantic Scientific Corporation, Plainview, N.Y.
[22] Filed: June 25, 1970
[21] Appl. No.: 49,812

[52] U.S. Cl.....................................340/317, 340/378
[51] Int. Cl..................................................G08b 5/00
[58] Field of Search....................340/317, 316, 338

[56] References Cited

UNITED STATES PATENTS 2,959,773   11/1960   Marsh......................340/316
3,117,312   1/1964    Watson....................340/316
2,426,079   8/1947    Bliss.......................340/338

Primary Examiner—Thomas B. Habecker
Attorney—Pennie, Edmonds, Morton, Taylor & Adams

[57] ABSTRACT

A thermometer-type indicator is described wherein a flexible, thin, self-supporting tape is caused to move in a housing such that its leading edge forms a thermometer-like representation of an electrical input signal in a viewing window in the housing.

7 Claims, 2 Drawing Figures

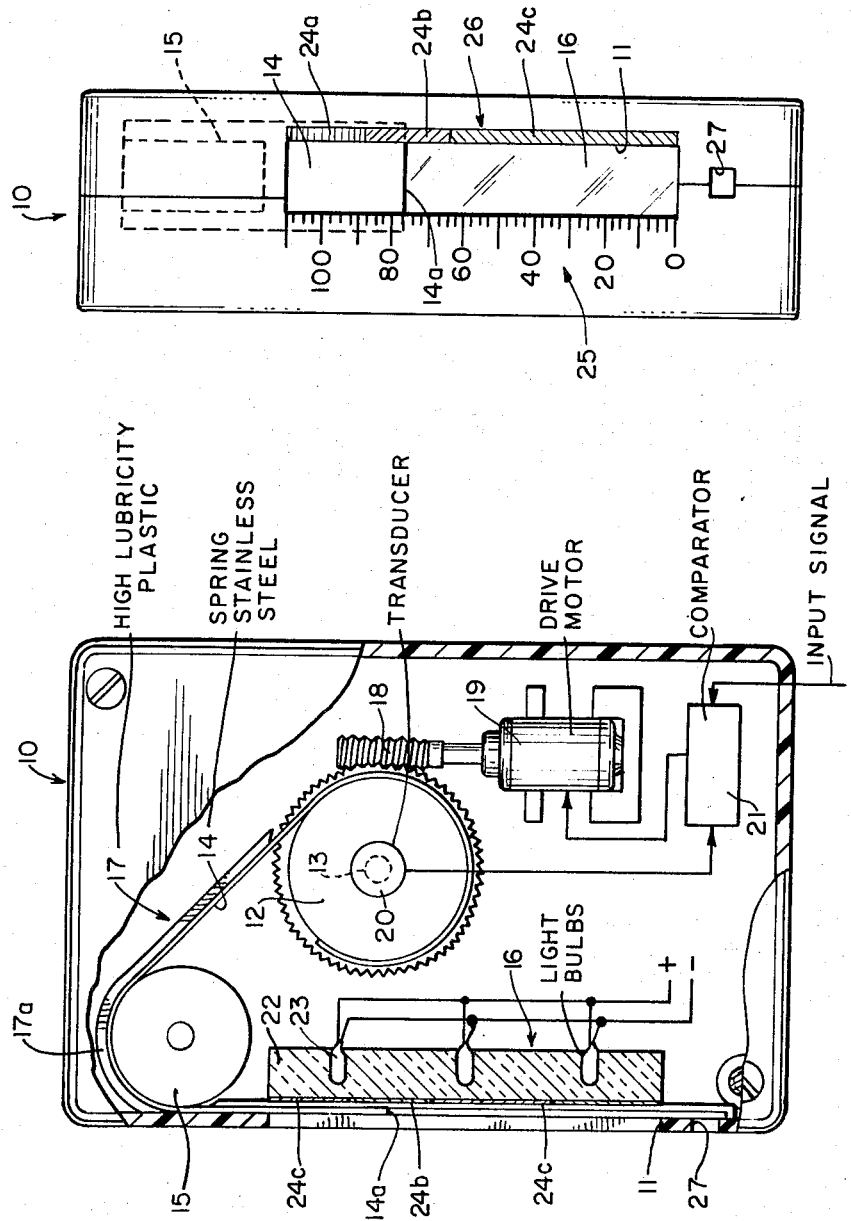

_3,696,386_

THERMOMETER-TYPE INDICATOR

BACKGROUND OF THE INVENTION

1. Field of the Invention

This invention has to do with tape readout instruments or indicators for displaying electrically representable variables in the form of a thermometer-like column having a height corresponding to the value of the variable. Typically, such instruments comprise an endless tape or band inscribed at some point along its outer surface with an indicia or marking. Often, the indicia is simply the termination of a colored portion of the tape. The endless tape is usually guided at one end over a driving drum and at the other over a reversing roller arranged within a housing and having a relatively small diameter in comparison with the driving drum. A panel of the housing is commonly provided with a viewing window and the tape is movable in back of the window so that it is visible through the opening as the tape is displaced by the associated instrument or the like. Usually, also, the window is elongated and has a scale or calibration along one edge. The tape has an indicating column, which is progressively visible through the elongated opening to cooperate with the scale for providing an indication of the input signal.

2. Description of the Prior Art

Instruments of this type employ in general a pair of rollers, one of them driven, supporting an endless belt. Design requirements ordinarily necessitate that the belt be strong, dimensionally stable, and highly resistant to wear under adverse environmental conditions. Hence such belts are usually made of neoprene impregnated fabric, which is necessarily opaque and are generally painted in brightly contrasting colors such that the boundary line between the colors appears to mark the top of a mercury column in a thermometer. The nature of and requirements placed upon such endless tapes has not generally permitted the use of transparent materials and thus has precluded back-lighting the tape to provide instruments satisfactory for night operation.

While a conventional opaque endless tape can be painted and front lighted so that it is readable under night time conditions, it is virtually impossible to construct such instruments in a way permitting a color change to indicated movement of the indicator between operating regions, as required by various military specifications, under night conditions. Exemplary of such color changes is the red border often found on speedometers above a certain speed range, or found on pressure gauges above a critical pressure, to warn of impending danger.

BRIEF DESCRIPTION OF THE INVENTION

In accordance with the invention, a thermometer-type indicator is provided in which a self-supporting tape is movable longitudinally along a track formed in a housing, such that movement of the tape is response to an input signal is viewable through a window in the housing to provide a thermometer-like indication corresponding to the input signal. Because the tape is not endless, as in conventional indicators of this type, and is self-supporting such that it can be moved longitudinally in a track in the housing, a leading edge of the tape is visible in the viewing window to indicate the value of the input signal. In contrast to conventional instruments requiring an opaque belt, wherein the leading edge of the thermometer column is simulated by a color or contrast change, the invention permits the use of back-lighting or through-lighting such that the light source is visible through the portion of the viewing window not covered by the tape.

In a particularly advantageous embodiment of the invention, a thin, flexible, self-supporting spring steel tape wound upon a drum is guided from the drum along tracks extending in the housing past the viewing window, so that when the drum is turned by an electric motor, the leading edge of the tape simulates the rise and fall of a thermometer column in the viewing window. Differently colored transparent or translucent segments behind the tape, visible through the viewing window, may be employed to provided ready indications of a change from one operating region of the indicated variable to another. Alternatively, the tape may be made of brass, titanium or other materials which have the requisite characteristics, as described herein.

A transducer may be provided on the drum such that its output signal is representative of the rotational position of the drum, and hence of the height of the simulated thermometer column. A comparator connected to signal the difference between the transducer signal and the input signal to the indicator may be connected to energize the drive mechanism in such manner that the difference between the compared signals tends toward zero. The drive mechanism may be a motor, solenoid actuated stepping switch or other equivalent electromechanical drives.

BRIEF DESCRIPTION OF THE DRAWINGS

Specific embodiments of the invention will be described in connection with the attached drawings, in which:

FIG. 1 is a side elevational view, partially cut away, of an indicator in accordance with the invention; and FIG. 2 is a front elevational view of the device of FIG. 1.

DESCRIPTION OF THE PREFERRED EMBODIMENTS

In the embodiment of FIGS. 1 and 2, a housing 10 provided with a viewing window 11 contains therein a drum 12 rotatable on a shaft 13 extending from the housing. A thin spring steel tape 14 is wound upon the drum and extends therefrom about a shaft mounted pulley 15 downwardly between a translucent panel 16 and viewing window 11. Substantially all along its path, tape 14 is supported by tracks 17 formed integrally with the housing. Such tracks are provided on both sides of tape 14 and the track width is wider by at least a few mils than the tape width to minimize sliding friction therebetween.

Drum 12 is shown schematically connected through a worm gear 18 with a DC drive motor 19. A transducer 20 mounted on drum 12 provides an electrical output indicative of the rotational position of the drum with respect to a fixed reference angle, and the transducer output is connected along with the wire carrying the input signal to the device, to a comparator 21. The output of the comparator is connected to DC drive motor 19 such that the drive motor rotates drum 12 to position the tape at whatever point corresponds to zero difference between the feedback signal from transducer 20 and the input signal.

Translucent panel 16 includes a back-lit block, preferably of clear translucent plastic, having embedded therein one or more miniature bulbs 23 of low power dissipation, the number and size of such bulbs being adequate to evenly illuminate the block. Light bulbs 23 are connected in a circuit, as shown, connectable to a power source for the bulbs. Preferably, provision is made for adjusting their light intensity, such as by a potentiometer (not shown) in order to achieve maximum flexibility over a wide range of viewing conditions from bright sun light to nighttime. The front face of block 22 is provided with surface coatings 24a, 24b and 24c which are translucent and of different colors in order to easily differentiate the regions of the indicator scale which they represent. Coatings 24 may be in the form of thin (i.e. a few mils) translucent plastic strips glued to the face of block 22, or may be different colored translucent inks painted onto the block.

It is not necessarily required that block 22 be translucent; it may for example be transparent with translucent coatings providing adequate light dispersion over the panel surface. Coating 24a may be green or white coating, 24b amber and coating 24c red in order to indicate increasing danger in the parameter indicated. In this manner, a highly flexible and easily readable indicator viewable under a wide variety of lighting conditions is provided.

As shown in FIG. 2, a scale marking 25 is preferably provided on housing 10 adjacent one edge of viewing window 11, and the housing may also be provided with color markings 26 paralleling those of the coatings 24. Markings 26 may be used for daytime operation as well as to provide an image of the operating regions of the indicator even when tape 14 covers most of the viewing window. Scale markings 25, or at least those indicating major scale divisions, may be cut through housing 10 so that the scale is illuminated by transparent panel 16.

It will thus be seen that as tape 14 rises from its fully lowered position in the viewing window, it provides uncovers below its leading edge 14a a continuous ribbon of light having a length proportional to the value of the input signal and which changes colors as the input signal passes from one predetermined region to the next. For daylight operation or other instances where back-lighting is not desired, the exposed surface of coating 24 may be made sufficiently reflective that a ribbon of color in stark contrast to the flat black (for example) of the tape is formed as the tape is raised. The net effect, from the point of view of safety, accuracy, readability and attractiveness, is a marked improvement over prior devices of this type.

Advantageously, housing 10 may be formed from a small number of molded plastic elements, preferably polytetrafluoroethylene or a similar high lubricity material facilitating movement of tape 14 in the tracks formed thereby. Track 17 includes guide members 17a and 17b disposed about the periphery of roller 15 and drum 17b to provided additional support of the tape at points of substantial curvature. Only one side of track 17 is shown in FIG. 1; it will be apparent that the other side, which is the mirror image of the side shown, is formed in the wall of housing 10 which is cut away in FIG. 1. Tape 14 must be flexible, highly durable and able to operate under adverse environmental conditions. Importantly, tape 14 must be self-supporting, which term is used herein to describe its ability to move in the manner indicated in track 17 as drum 12 is rotated without buckling, folding or flexing in such manner as would interfere with an accurate readout. Similarily, the term "flexible" used herein to mean that degree of flexibility requisite to the proper functioning of the indicator. The width of tape 14 is greater than that of viewing window 11 so as to fill the entire window. For example, with a viewing window one-fourth inch wide, three-eighths inch tape may be used. In a particularly advantageous embodiment of the invention, the tape is a 1½ to 2 mil element of stainless spring steel with a black oxide finish, providing high durability and good flexibility and handling characteristics. Preferably, pulley 15 is provided with a slight convexity in its rim in order to center the tape.

Comparator 21 in itself forms no part of the present invention, and any subtractor or comparator compatible with the response characteristics and input levels to be used may be employed. An indicator window 27 may be provided immediately below the viewing window such that it is lit by panel 16 and is blacked out by the tape at the lower end of its travel to indicate that the indicator is off. In contrast, when the indicator is on, the tape may be caused to assume a lowermost position immediately above the indicator window. Alternatively, a brightly covered spot on the tape just below the upper edge of the viewing window may indicate that the indicator is off.

While the present invention has been described by reference to particular embodiments thereof, it is to be understood that this is by way of illustration of the principles involved and that those skilled in that art may modify or refine the arrangements and modes of operation described while remaining within the scope of the invention defined by the following claims.

I claim:

1. A thermometer-type indicator comprising:
   a housing having a viewing window in the form of a thermometer-like column and having track means therein for supporting a movable tape having a leading edge viewable through said window:
   a self-supporting tape movable longitudinally in said track such that a variable length thereof is visible through said viewing window, the leading edge of said tape forming a thermometer-like representation therein having a height corresponding to the analog value of a variable to be displayed; and
   drive means responsive to an input signal for variably positioning said tape in the viewing window in the form of a thermometer-like column in accordance with such input signal in a substantially continuous manner such that the position of the leading edge is capable of representing in analog form any value of said variable to be displayed.

2. A thermometer-type indicator comprising:
   a housing having a viewing window and forming a track therein for supporting a movable tape having a leading edge viewable through said window;
   a flexible, self-supporting, opaque tape movable longitudinally in said track such that a variable length thereof is visible through the viewing window, the leading edge of said tape forming a thermometer-type representation therein; and means responsive to an input signal for moving said tape in the viewing window, including a drum having said tape wound thereon and positioned such that its rotation moves the tape in the viewing window, and a motor connected to drive the drum.

3. A thermometer-type indicator as defined in claim 2 including a transducer coupled with the drum for providing an electrical signal indicative of drum position, and a comparator for comparing the transducer signal with such input signal and for energizing the motor such that the difference between the compared signals tends to zero.

4. A thermometer-type indicator as defined in claim 2 wherein said housing is formed of a high lubricity plastic, including a track integrally molded therein such that the tape is readily slidable along the track.

5. A thermometer-type indicator as defined in claim 2 including a translucent panel disposed behind the viewing window to illuminate that portion of the viewing window exposed by the tape.

6. A thermometer-type indicator as defined in claim 5 wherein said translucent panel is provided with plural translucent colored coatings for indicating plural operating regions of the input signal.

7. A thermometer-type indicator as defined in claim 2 wherein said tape is formed of spring stainless steel having a thickness between about 1½ to 2 mils.

* * * * *